United States Patent [19]

Saikan et al.

[11] Patent Number: 5,568,460
[45] Date of Patent: Oct. 22, 1996

[54] OPTICAL RECORDING AND/OR REPRODUCING APPARATUS AND METHOD UTILIZING STIMULATED PHOTON ECHO

[75] Inventors: Seishiro Saikan, Toyonaka; Kiyoshi Uchikawa, Tokyo; Hisao Ohsawa, Yachiyo, all of Japan

[73] Assignee: Nikon Corporation, Tokyo, Japan

[21] Appl. No.: 480,387

[22] Filed: Jun. 7, 1995

Related U.S. Application Data

[63] Continuation of Ser. No. 155,537, Nov. 22, 1993, abandoned, which is a continuation of Ser. No. 600,717, Oct. 22, 1990, abandoned, which is a continuation-in-part of Ser. No. 477,446, Feb. 9, 1990, abandoned.

[30] Foreign Application Priority Data

| Mar. 27, 1989 | [JP] | Japan | 1-74197 |
| Oct. 24, 1989 | [JP] | Japan | 1-276395 |
| Oct. 26, 1989 | [JP] | Japan | 1-279559 |
| Dec. 11, 1989 | [JP] | Japan | 1-318905 |

[51] Int. Cl.$^6$ .......................... G11C 13/04; G11C 11/42; G11B 7/00
[52] U.S. Cl. .......................... 369/100; 369/275.2; 369/288; 365/119; 365/106; 365/121
[58] Field of Search .......................... 369/110, 111, 369/13, 44.37, 44.38, 275.3, 275.5, 275.4, 109, 100, 44.26, 103, 275.12, 288; 360/114; 365/119, 106, 120, 121, 251, 234, 216

[56] References Cited

U.S. PATENT DOCUMENTS

| 3,638,029 | 1/1972 | Hartmann et al. | 365/119 |
| 4,101,976 | 7/1978 | Castro et al. | 365/119 |
| 4,167,024 | 9/1979 | Hamisch | 369/44.13 |
| 4,334,299 | 6/1982 | Komurasaki et al. | 369/109 |
| 4,446,548 | 5/1984 | Bouwhuis et al. | 369/109 |
| 4,458,345 | 7/1984 | Bjorklund et al. | 369/103 |
| 4,459,682 | 7/1984 | Mossberg | 365/119 |

(List continued on next page.)

FOREIGN PATENT DOCUMENTS 0047845  3/1987  Japan .................................. 369/44.24

OTHER PUBLICATIONS

Babbitt, W. R. et al, *Optics Communications*, "Time-Domain Frequency-Selective Optical Data Storage in a Solid-State Material", 1988, vol. 65, No. 3, pp. 185–188.

Mitsunaga, M. et al, *Optics Letters*, "Degenerate photon echoes: simultaneous storage of multiple optical data", 1988, vol. 13, No. 6, pp. 536–538.

Bai, Y. S. et al, *Optics Letters*, "Coherent transient optical pulse-shape storage/recall using frequency-swept excitation pulses", 1986, vol. 11, No. 11, pp. 724–726.

*Primary Examiner*—Georgia Y. Epps
*Assistant Examiner*—Kim-Kwok Chu
*Attorney, Agent, or Firm*—Shapiro and Shapiro

[57] ABSTRACT

The recording method and apparatus according to this invention is an "optical recording method utilizing a simulated photon echo" in which information is recorded by irradiating data and record excitation lights at the same time or at different times on the same location of a recording medium, and in which the delay time of a record excitation light electric field and a data light electric field is recorded as the information by use of a common incoherent light split into two equal parts: the data light and the record excitation light. In the reproducing method and apparatus according to this invention, reproducing excitation and probe lights are illuminated on the recording medium and the stimulated photon echo light emitted from the medium by illumination of the reproducing excitation light overlaps the probe light. The "stimulated photon echo" reproducing the information is utilized by converting the synthetic light obtained from the overlap into an electrical signal at a photo detector. A common incoherent light is split into two equal parts, the reproducing excitation and the probe lights, whereby the delay time of the reproducing excitation light electric field and the probe light electric field is set to predetermined values, or a first predetermined value is swept to a second predetermined value.

19 Claims, 12 Drawing Sheets

U.S. PATENT DOCUMENTS

| | | | |
|---|---|---|---|
| 4,488,277 | 12/1984 | McFarlane et al. | 369/48 |
| 4,549,287 | 10/1985 | Hatano et al. | 369/13 |
| 4,549,288 | 10/1985 | Chan | 369/48 |
| 4,839,882 | 6/1989 | Janssen | 369/100 |
| 4,853,912 | 8/1989 | Akasaka et al. | 369/100 |
| 4,868,787 | 9/1989 | Okada | 365/106 |
| 4,949,331 | 8/1990 | Maeda et al. | 369/111 |
| 4,985,226 | 1/1991 | Satoh et al. | 365/119 |
| 4,985,881 | 1/1991 | Saito et al. | 369/13 |
| 4,996,682 | 2/1991 | Yanagihara et al. | 369/275.4 |
| 5,043,965 | 8/1991 | Iida et al. | 369/116 |
| 5,191,574 | 3/1993 | Henshaw et al. | 365/119 |
| 5,204,770 | 4/1993 | Kachru et al. | 359/264 |
| 5,297,076 | 3/1994 | Jefferson et al. | 365/119 |
| 5,325,324 | 6/1994 | Rentzepis et al. | 365/127 |

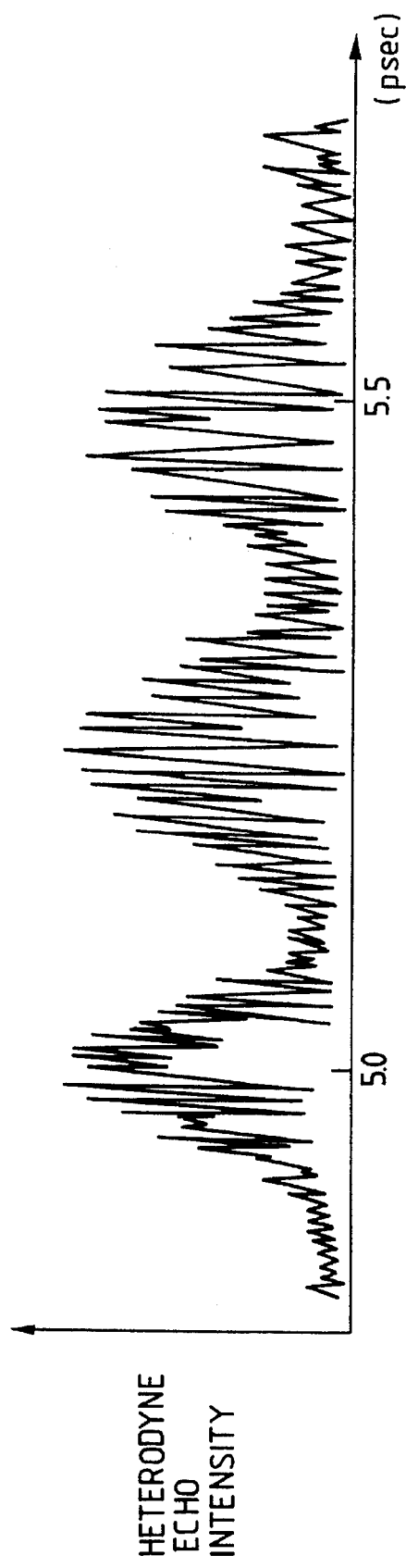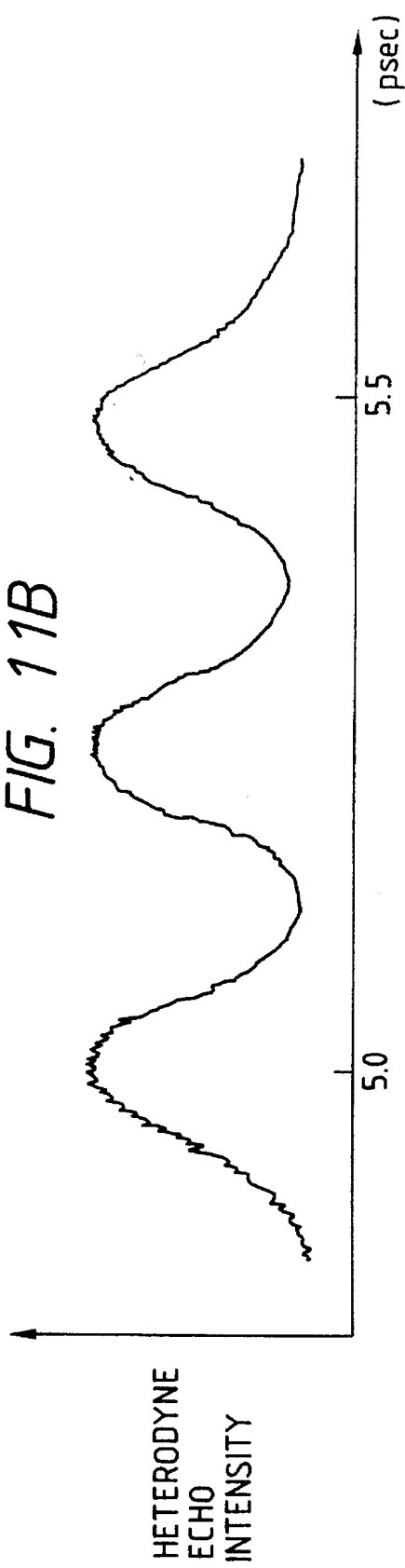

OPTICAL RECORDING AND/OR REPRODUCING APPARATUS AND METHOD UTILIZING STIMULATED PHOTON ECHO

This is a Continuation of application Ser. No. 08/155,537 filed Nov. 22, 1993, which is a continuation of application Ser. No. 07/600,717 filed Oct. 22, 1990 which is a continuation-in-part of application Ser. No. 07/477,446 filed Feb. 9, 1990, all now abandoned.

BACKGROUND OF THE INVENTION

1. Field of the Invention

This invention relates to an entirely novel optical recording method and reproducing method and recording apparatus and reproducing apparatus utilizing stimulated photon echo.

More particularly, the invention utilizes a recording medium which allows a Hole Burning memory persistently or transiently.

2. Related Background

An optical recording method which permits writing at random is generally achieved by rotating a disk-like optical recording medium and modulating the intensity of a narrowly diaphragmed light spot on the medium in response to binary-coded information to be recorded, thereby generating binary bits onto a recording layer.

In the above case, because the bits generated on the recording layer are two-dimensional, a narrower light spot must be made to allow higher recording density, and thus optical diffraction limits determine a recording density. Proposals is using much greater dimensions have been made to break through such two-dimensional writing limits. Above all, methods utilizing the wavelength dimension of a writing light have been extensively researched. The methods are generally referred to as a Hole Burning memory. Of these, one whose memory is not transient (information is not lost in relatively short time) but persistent is specifically called Persistent Spectral Hole burning or Photochemical Hole Burning or PHB or PSHB in short.

The record reproducing methods using a recording medium which permits use of the Hole Burning memory includes the following two methods:

(1) Method according to a frequency domain memory

A record reproducing method utilizes the wavelength dimension of a writing light. A narrow banded variable wavelength laser is used as writing and reading lights to write and record a wavelength-controlled hole (a peak where transmissivity increases in the manner of selecting the wavelength by light illumination) in zero photon absorption band inhomogeneously spread on a recording medium.

(2) Method according to a time domain memory

In this method, by employing pulse lights as reading and writing lights, basically a phenomenon called a stimulated photon echo is utilized to record the time correlation of the two pulse lights. At this stage, a uniquely shaped hole is recorded corresponding to the time correlation of the pulses in a wavelength space of the recording medium.

The conventional method of the time domain memory is herein described further in detail and some of its problems are clarified.

As is well known, a light excited state of a substance is expressed by an equation of motion of its density matrix (Liouville equation). For the sake of convenience, the relaxation time of density matrix diagonal element is called T1 time (vertical relaxation time) as distinguished from the relaxation time of density matrix non-diagonal element, which is called T2 time (horizontal relaxation time). A vertical relaxation is considered to mean a process of relaxing the light excited state with an energy release and a horizontal relaxation is regarded as a process to disturb the coherence of the electrical polarization vibration in the Substance brought on by an incidence light.

The photon echo phenomenon is considered to be a type of third dimensional non-linear optical effect. The stimulated photon echo in the phenomenon is described in connection with FIG. 5.

In the case where a substance is assumed to be excited by a proper pulse light in an energy resonance manner, the light of E0 is first incident on a time origin and the light of E1 is then incident on the t1, and a third pulse E2 is incident on t2, a light is then in return reflected from a substance to a (t1+t2). This is a photon echo light. If the Liouville equation is calculated by the disturbance development of rotating wave and weak excitation light approximations, and it is assumed that the inhomogeneous width of the substance is wider than that of a excitation spectrum, the amplitude of an electric field vector P(t) of an echo in a certain space direction in phase matching is then obtained n the following equation.

$$P(t) \propto i \int_0^\infty d\tau \int_0^\infty d\tau' \, e^{-\Gamma\tau'} e^{-2\gamma\tau} \times U \quad (1)$$

$$\left[ \begin{array}{rl} \text{where } U & = E2(t-\tau-t2) \times \\ & \quad E1(t-\tau-\tau'-t1) \times \\ & \quad E0^*(t-2\tau-\tau') \\ \Gamma = \dfrac{1}{T1} & \gamma = \dfrac{1}{T2} \end{array} \right]$$

For simplification, if E0, E1 and E2 are assumed to be very narrow time widths, the equation can be formulated to the following equation (2).

$$P(t) \propto i \, e^{-\Gamma(t2-t1)} e^{-2\gamma t1} \times V \quad (2)$$

$$\left[ \begin{array}{rl} \text{where } V & = \delta(t-t2-t1) \\ \delta & = \text{a delta function} \end{array} \right]$$

In the above case, the intensity an echo light |P|2 for t1 and (t2−t1) is attenuated by exp (−t2−t1/T2),

[exp (−2(t2−t1)/T1], respectively, where T2 is the aforementioned horizontal relaxation time and T1 the vertical relaxation time.

As is clear from the above equation, for the generation of the stimulated photon echo, an element relaxed at the T1, that is the diagonal element of the density matrix in a state has a significant meaning. When the diagonal element of the density matrix after the E1 pulse is illuminated, the following equation is obtained.

$$\rho_{ee}^{(2)} \propto (2\pi\Gamma)^{-1} \int_{-\infty}^{\infty} d\omega \frac{4\gamma}{(\Omega-\omega)^2 + \gamma^2} W \quad (3)$$

[where, W=1+cos ωt1]

where the wave vectors of E0 and E1 are almost the same and sufficiently short in their pulse widths. The Ω is a resonance angle frequency in a two-level system. The above shows that the state distribution within the in homogeneous width is modulated by the amount in relation to the time t1. This is called a population grating. It may be interpreted that a photon echo light (wave) is diffracted by the population grating.

Basically, in the time domain memory using the stimulated photon echo, either the E0 or E1 becomes a recording excitation light or a data light and both of them form a writing light.

In a read process, the E2 becomes a reproducing excitation light, forming a reading light together with the photon echo light generated. For example, reproduction of the data light by the photon echo is shown in FIG. 6, where the E0 is used as a recording excitation light and E1 as a data light. At this stage, the data light is in digital signals and the reproducing excitation light E2 is equal to E0 for convenience, though it is not necessarily equal.

Thus, in the time domain memory, the amount of recording information is governed by the time T2 and the recording time by the time T1.

If a state, other than the two-level system relating to light absorption, involving a long relaxation time generally called a bottleneck state exists, the time T1 is relatively prolonged. When the light excited state can change, as a PHB recording medium does, to a chemically metastable state called a production state, the population grating in a ground state is semipermanently maintained at low temperatures. In this case, even though the (t2 to t1) in FIG. 5 is prolonged infinitely, the data light can be reproduced as the echo light by means of a reproducing excitation light.

In a system where the time T1 is adequately longer than the time T2, the repeated process of writing at t1<T2 will accumulate the modulation element at the density matrix diagonal element. In this case, a sufficiently weak light is capable of generating a relatively intense echo light. This is generally called an accumulated photon echo process.

The conventional method using such basic applications as the above (e.g. Refer to Opt. Commu., 65, 185 (1988), Opt. Lett., 13 536 (1988) and Opt. Lett., 11,724 (1986) has the following problems:

(1) Since a PHB recording medium whose memory time is relatively long (persistent) usually tends to have a short time T2, an ultra short light pulse must be employed for the data light when recording voluminous information.

The ultra short light pulse is, however, subject to environmental influence and up to now has some problems regarding generation.

Accordingly, the pulse width of a light pulse regarded as being suitable for practical use has a limitation of about one picosecond, which leads to a comparatively small memory capacity.

(2) In the conventional method, the time change of a light intensity must be observed in order to detect and decode the echo light reproduced.

A high speed photo detector, such as a streak camera, now has a time resolution of at most one picosecond and also its sensitivity does not improve even though the time resolution of the detector improves. As stated before the intensity of the echo light in the data pulse matrix is attenuated by the exp (−4 t1/T2).

In a persistent large capacity time memory, there are no light detectors with a wide dynamic range which decode the echo light at high data transmission and efficient S/N ratios. Thus, in the conventional method, information in the persistent large capacity time memory cannot be reproduced at high data transmission and efficient S/N ratios.

SUMMARY OF THE INVENTION

It is an object of the present invention to realize a much larger time domain memory regardless of permanence or transition and to reproduce information at a higher S/N ratio.

The recording method and apparatus according to the invention are characterized in that a data and a recording excitation light are illuminated separately or at the same time on a recording medium which permits persistent or transient Hole Burning memory so that in the optical recording method utilizing stimulated photon echo a common incoherent light is split by means of the data light and the recording excitation light into equal parts in order to record the delay time of a recording excitation electric field and a data light electric field as information.

The recording method and apparatus according to the present invention are further characterized in that the illumination of two or more data lights with different information on the recording medium provides multiple writing.

The reproducing method and apparatus according to the present invention are characterized in that "stimulated photon echo" reproducing information is utilized where a reproducing excitation light and a probe light are illuminated on the recording medium which permits persistent or transient Hole Burning memory to overlap the stimalated photon echo generated by the illumination of the reproducing excitation light and the probe light. The synthetic light obtained from the overlapping is then converted into an electrical signal and then a common incoherent light is split into two equal parts, the reproducing excitation light and the probe light, whereby the delay times of a reproducing excitation light electric field and a probe light electric field (delay time means the time lag which occurs before the same phase part in both the electrical fields reaches the medium) is set to any predetermined value, or a first predetermined value is swept to a second predetermined value.

As is clear from the equation (1), a photon echo time property is expressed by the electric field time correlation function of the recording excitation light, data light, and reproducing excitation light.

For example, if the time properties of each pulse, E0, E1 and E2 are assumed to be equal and an autocorrelation function relating to the time is assumed to have a half-value width of about the pulse width, the echo generated after the time (t1+t2) has the same or more recording and reproducing excitation pulses.

The state of the data light produced as described above is to have a "blur" of about the pulse width in relation to the time.

In this specification, a light whose autocorrelation function is about the width of the pulse width is called the pulse light of a coherent light. As long as this kind of light is utilized, it is difficult to solve the problem related to the large capacity time memory described above. This leads to the use of a light whose half-value width of the autocorrelation function with respect to the time in the electric field is narrower than the pulse width. Such a light as above is called a pulse light of incoherent light in this specification.

In the above case, the "blur" related to the time of the data light reproduced is limited to the proximity of the correlation time of each excitation and data light, that is the half-value width of the autocorrelation.

According to the Wiener-Khintchine theorem, since the electric field correlation time of light is about the inverse number of the half-value width of its power spectrum, the use of a light with an extremely wide spectrum width as an excitation light would reduce the "blur" in relation to the time of echo generated for 10 femtoseconds or less.

In other words, when an incoherent light is used, recording density or memory capacity can be improved 100 times or more than in the case where a coherent light is used. This is a principle of this invention regarding the writing process.

The reading process will now be described.

In the conventional art, regarding the method of detecting the time change of a light intensity, it is difficult in principle to detect precisely the echo light generated by an incoherent light.

The time resolution of 10 femtoseconds or less can be obtained when a notice is directed to the phase element of the light electric field and cannot be obtained from the light intensity of the conventional art.

In this invention, the heterodyne detecting method well known in radiowave engineering is applied to detect the phase element of light.

That is, a light (probe light) whose phase characteristic is already known overlaps with an echo light generated. The interference item in the light intensity when a probe light E3 overlaps the echo light electric field in the equation (1) is expressed in the following equation (4).

$$S \propto Re \, exp[-i\omega(t3-t2-t1)] \times X \quad (4)$$

where $$X = \int_0^\infty d\tau GR(\tau - t3 + t2) \times GW^*(\tau - t1) \times exp(-2\gamma\tau)$$

where, GW and GR represent respectively the time correlation function of E0 and E1, and E2 and E3.

If E0 and E2 are the lights from the same incoherent light source and E1 and E3 are generated through the suitable time delay system of E0 and E2, respectively, GW and GR are the correlation function of the incoherent light.

If the correlation time of the incoherent light does not change greatly in response to time, GW=GR=G is obtained. In this case, the S is in the shape of the correlation function of G and its correlation time is substantially the same as the correlation time of the incoherent light.

Consequently, when the time for E3 to reach a recording medium is swept, that is when t3−t2=t1, an echo light will be detected with the time accuracy of about the correlation time of the incoherent light.

If E1 overlaps a plurality of E0 lights with different delay time, provided that the time correlation item within the E1 is ignored, the equation (4) becomes a linear equation.

When t3−t2 is swept, a plurality of echo lights can thus be detected independently.

The above is the reading principle in the specification.

The above object and other objects and advantages of the invention will become clear from the following description of the preferred embodiments thereof, taken in conjunction with the accompanying drawings.

BRIEF DESCRIPTION OF THE DRAWINGS

FIGS. 11A and 11B are views showing the results of experiments according to the fourth embodiment;

DESCRIPTION OF THE PREFERRED EMBODIMENTS

This invention is described hereinafter in connection with the above mentioned embodiments. The invention, however, is not limited to these embodiments only.

First Embodiment: Optical Recording Method and Apparatus

Figure 1:
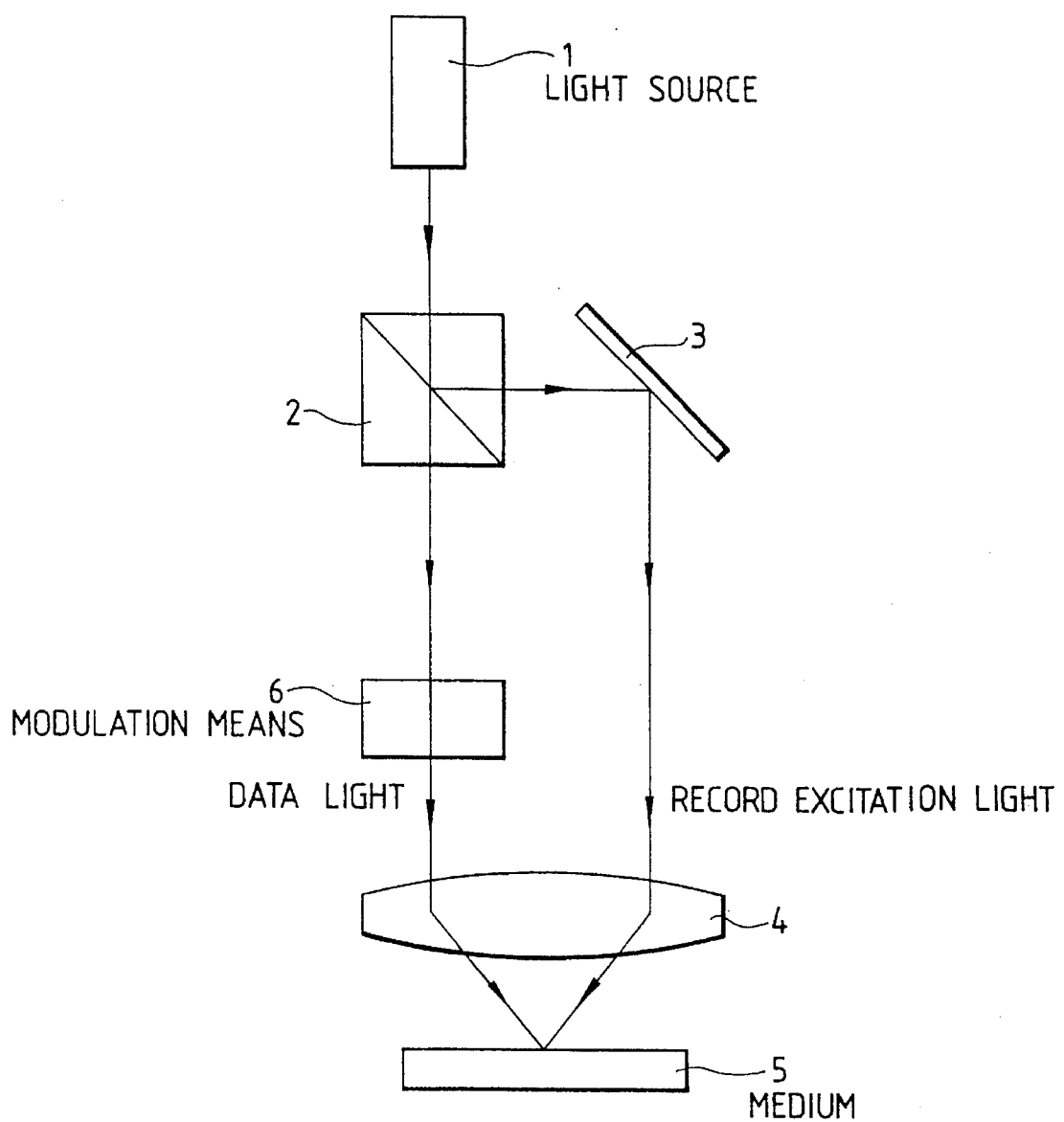
FIG. 1 is a view showing the major components of a first embodiment of the optical recording apparatus, illustrative of the principle of the invention.

As shown in FIG. 1, an incoherent light generated in a light source 1 is split by a beam splitter 2 into a record excitation light and a data light.

Owing to the fact that the record excitation and the data lights are generated in the same light source, they have good phase characteristics and an efficient S/N ratio when writing on a medium 5.

The record excitation light is reflected at right angles in a reflecting mirror 3, impinges upon a lens 4 (part of the Optics system in the invention), and is condensed thereon to illuminate a recording medium 5 which permits the Hole Burning memory.

The data light travels from the beam splitter 2 into a modulation means 6 where the delay time of a record excitation light electric field and a data light electric field changes in response to information to be recorded. The data light becomes a true data light after passing through the modulation means.

A modulated data light is incident on the lens 4 and then condensed thereon to illuminate in the same location as the incident location of the record excitation light on the PHB recording medium 5. In this case, the region in the medium where both the record excitation and data lights pass through is the region recorded.

When the record excitation and the data lights impinge upon the medium 5 at the same time or different times (which includes when the record excitation light impinges upon the medium after the data light does), the record excitation light as well as the data light is capable of recording on the medium 5.

Second embodiment: Reproducing Method and Apparatus

Figure 2:
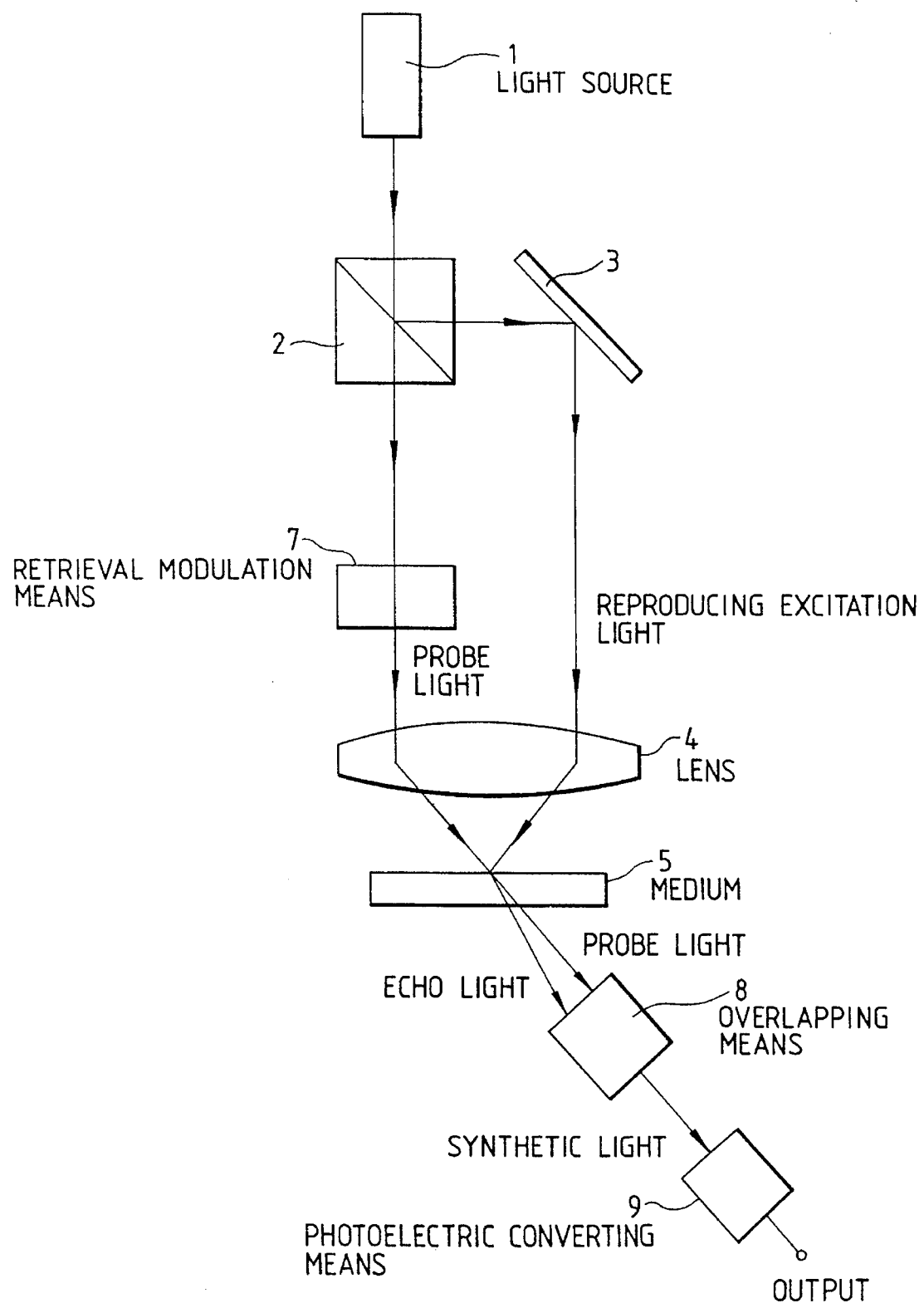
FIG. 2 is a view illustrating the main components of a second embodiment of the optical recording apparatus, illustrative of the principle of the invention.

As shown in FIG. 2, the light source 1 serves both as a reproducing excitation light source which emits an incoherent light and a probe light source which emits an incoherent light. The light from the light source 1 is split by the beam splitter 2 to reproduce both the excitation and the probe lights. The reproducing excitation light is reflected at right angles by the reflecting mirror 3, impinges upon the lens 4 (part of the optics system in the invention), and is condensed thereon to illuminate the recording medium 5, which permits the Hole Burning memory.

The delay time in the electric field of the probe, corresponding to the reproducing excitation light electric field, which travels from the beam splitter 2, is changed by a retrieval modulation means 7.

At this time, the correlation function with respect to the time between the reproducing excitation light electric field and the probe light electric field is satisfied in a relation where it has at least one of the maximum values.

The probe light impinges upon the lens 4 and is condensed thereon to illuminate the same location as the illumination location of the reproducing excitation light on the recording medium 5.

An echo light is emitted in predetermined one or more directions, depending upon the incidence directions of the recording excitation light, the data light and the reproducing excitation light.

The echo light from the medium 5 and the probe light transmitted through the medium 5 are overlapped in an overlapping means 8 and interfere with each other to become a synthetic light.

The synthetic light is finally incident on a photo detector 9 where it is converted into an electrical signal, which is modulated corresponding to information recorded on the medium.

Third Embodiment: Optical record Reproducing Apparatus and Method

Figure 3:
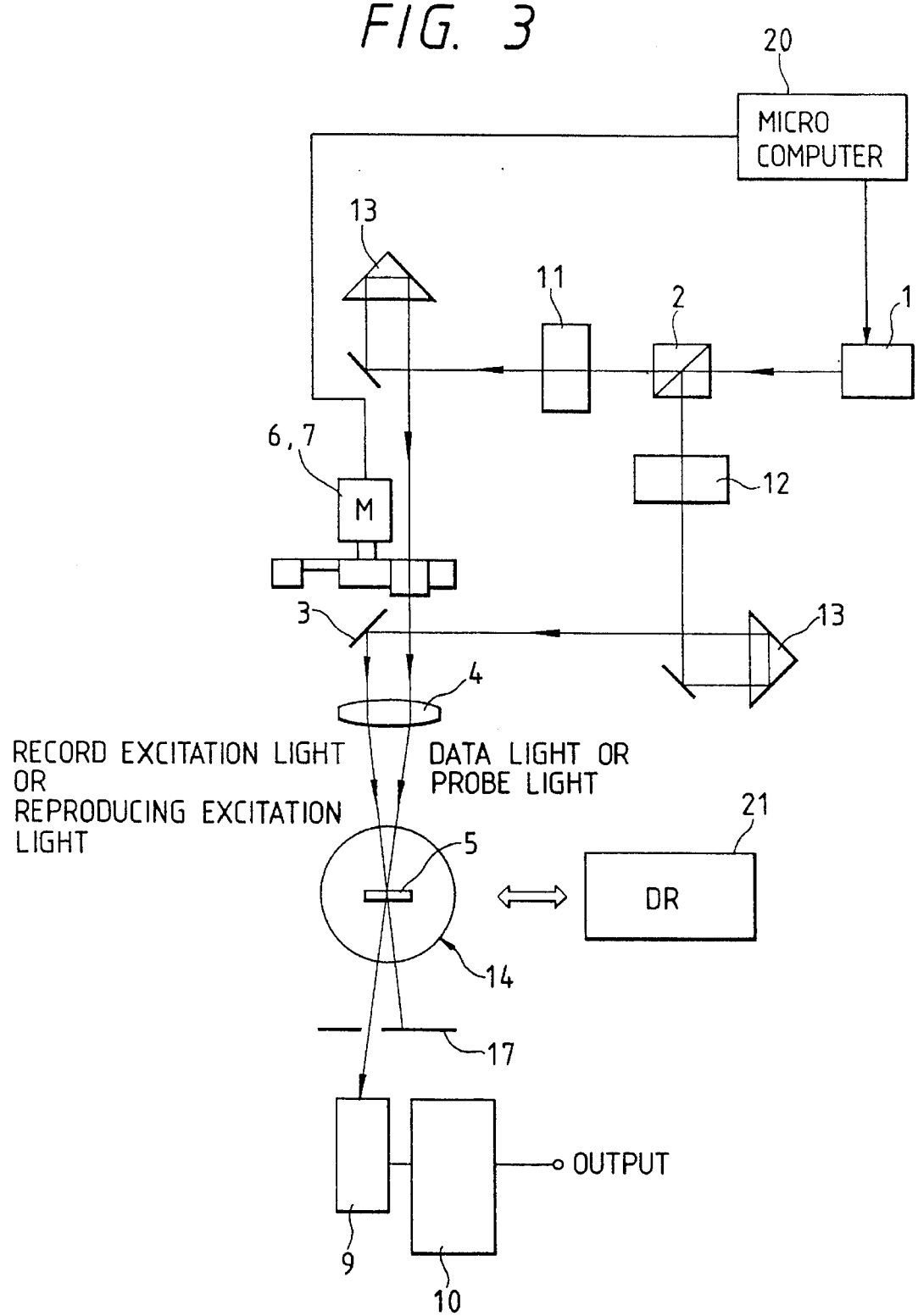
FIG. 3 is a view showing the major components of the optical record reproducing apparatus in connection with a third embodiment of the invention, illustrative of the principle of the invention.

As shown in FIG. 3, the light source 1, a rhodamine 6G dye laser with a mode synchronization Ar$^+$ laser excitation emanates a pulse light with a repetitive frequency of about 80 MHz.

An output light is an incoherent light with a wavelength of 590 nm and a spectrum width of some 30 cm$^{-1}$ (corresponding to a correlation time of about 0.5 picoseconds), using a double refraction filter (not shown) to excite the zero photon absorption band of resorufine.

In this embodiment, since the recording and reproducing light sources are the same, the echo and probe lights have good phase characteristics and a high S/N ratio.

Figure 4:
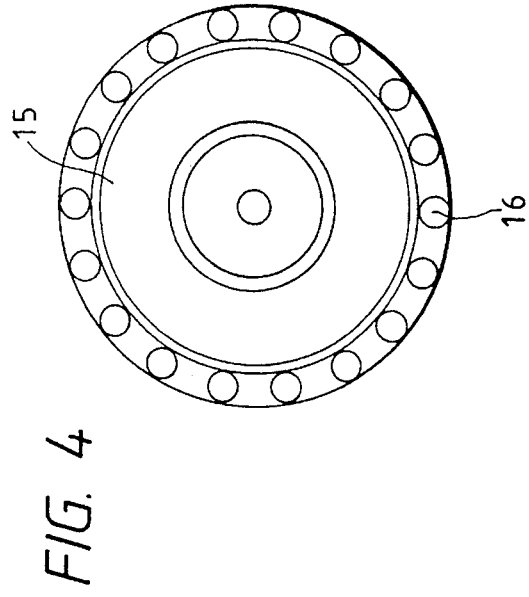
FIG. 4 is schematic plan view of the time modulator used in the third embodiment.
Figure 5:
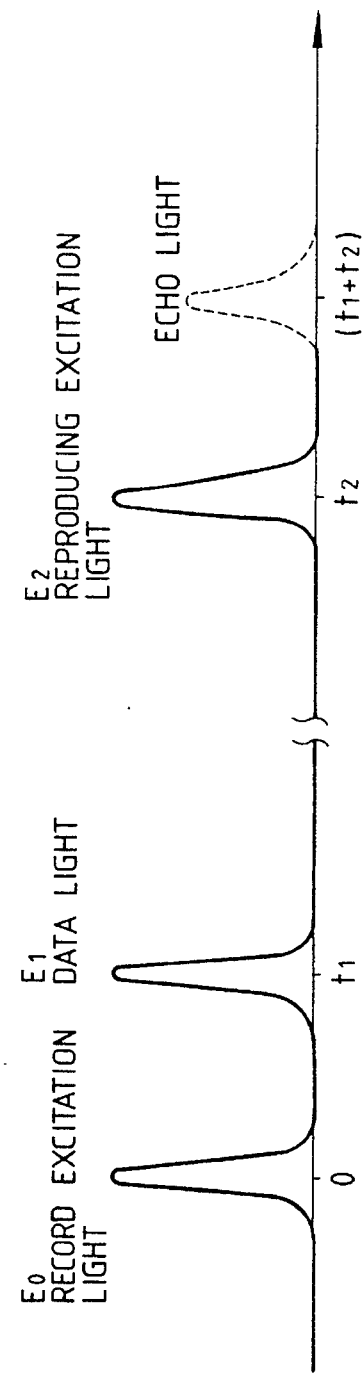
FIGS. 5 and 6 are descriptive diagrams showing the conventional art.

A microcomputer 20 controls the timing of the light emission operation and the light intensity in the light source 1, the operation of the modulation means and the operation of a drive 21 to move the medium 5. The modulation means 6 has a disk 15 and a motor to rotate the disk 15 as shown in FIG. 4 later. The microcomputer 20 modulates by controlling the operation of the motor.

Figure 6:
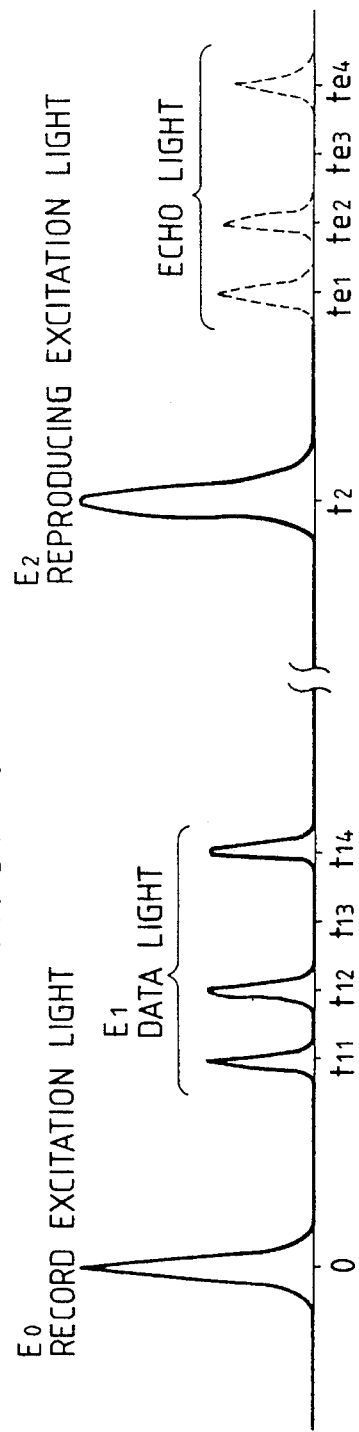

The microcomputer 20 also controls the following two writings:

(1) Multiwriting of a plurality of data lights on the same location of the medium The record excitation and data lights are written sequentially, by changing the delay time of the two, on the same location of the medium. When the reproducing excitation light illuminates the location, a plurality of data lights, for example, like the echo lights in FIG. 6 are reproduced.

(2) Writing data lights on different locations of the medium

Data writing is performed after the medium 5 travels to the drive 21.

The incoherent light from the light source 1 is split by the beam splitter 2 into the beams (a) and (b) with the following characteristics:

(a) Record excitation light (E0) or reproducing excitation light (E2)

(b) Data light (E1) or probe light (E3)

The light intensity of the reproducing excitation light of item (a) is modulated by 5 MHz (AM modulation) by a light modulator 12 (photoacoustic element), which is provided for improving the S/N ratio when reproducing; it is not indispensable to this invention.

The reproducing excitation light travels through a triangular prism 13, is reflected at right angles in the reflecting mirror 3, impinges upon the lens 4 and is condensed thereon to illuminate the recording medium capable of the Hole Burning memory.

The latter (b) is transmitted at an optical compensator 11 after exiting from the beam splitter 2. The optical compensator 11 is provided for the probe light to generate the wavelength dispersion of the delay time as in the case where the reproduction excitation light compensates for the wavelength dispersion of the delay time caused by passing through the light modulator 12. The optical compensator 11 is not therefore necessary to the invention.

Therefore, it is desirable not to modulate by using the same optical compensator 11 as the light modulator 12.

The data or probe light transmitted at the optical compensator 11 travels through the triangular prism 13 and further impinges upon a time modulator serving both as a modulation means 6 and a retrieval modulation means 7, and the data light is then modulated according to information to be recorded so as to change the delay time of the record excitation light electric field and the data light electric field.

The delay time of the reproducing excitation light electric field and the probe light electric field is swept by the time modulator with the means 6 and 7.

The data light modulated or the probe light swept by the above procedures thus impinges upon the lens 4 and is condensed thereon to illuminate the same location of the recording medium as the illumination location of the record excitation light or of reproducing excitation light.

The Optics system herein is so configured that the echo light is emitted in the same direction as the probe light after being transmitted through the medium 5. The probe light becomes an overlapped synthetic light of the echo and probe lights after transmitted through the medium 5.

In the transmitting direction of the probe light is arranged a photo detector 9 having a photo-multiplier by means of which the synthetic light travelling through a mask 17 is converted into an electrical signal. The electrical signal is then processed in a lock-in amplifier 10, from which only an AM modulation element is output.

Noise is eliminated from the output, then distinctly modulated in accordance with information. Numeral 14 in FIG. 3 denotes a liquid helium cryostat which cools the medium 5 to low temperatures. The embodiment will not function unless the medium 5 is kept at extremely low temperature.

Description of Time Modulator

FIG. 4 is a schematic plan view showing an example of the time modulator employed in the third embodiment, in which a large number of circular windows where glass plates

16 with different thicknesses are recessed are perforated along the circumference of a rotatable disk 15.

A large number of the glass plates 16, arranged in order from thinner to thicker, are utilized so that the light travelling time increases by one picosecond for each glass plate.

Example of Another Time Modulator

Another example of time modulator means for changing the delay time between the record excitation light electric field or the reproducing excitation light electric field and the data light electric field or the probe light electric field is to move an optical member having two reflecting planes, e.g. the reflecting mirror in FIG. 3, along the direction of the incident light. The change in the length of optical path changes the delay time.

The description for the recording and reproducing test actually performed by using the apparatus in the third embodiment is now given.

(1) As the recording medium 5 that allows the persistent Hole Burning memory, a film, approximately 100 μm thick, used for a recording layer, of polyvinyl alcohol dissolved in resorufine of 10.4% by weight of provided.

(2) The apparatus in the third embodiment is used as an optical record reproducing apparatus.

(3) The recording medium 5 is arranged within the liquid helium cryostat 14, the temperature being kept at 10 K. At this stage, T2, the relaxation time, is tens of picoseconds.

(4) The light delay time of the light transmitted through the glass plate 16 in FIG. 4 is changed by one picosecond by rotating the disk 15 of the time modulator.

(5) For the unwritten medium 5, the average output sum of the reproducing excitation light (E2) and the probe light (E3) is narrowed to about 0.1 μW so as to read the echo light with a change in the delay time of the probe light (E3).

Figure 7:
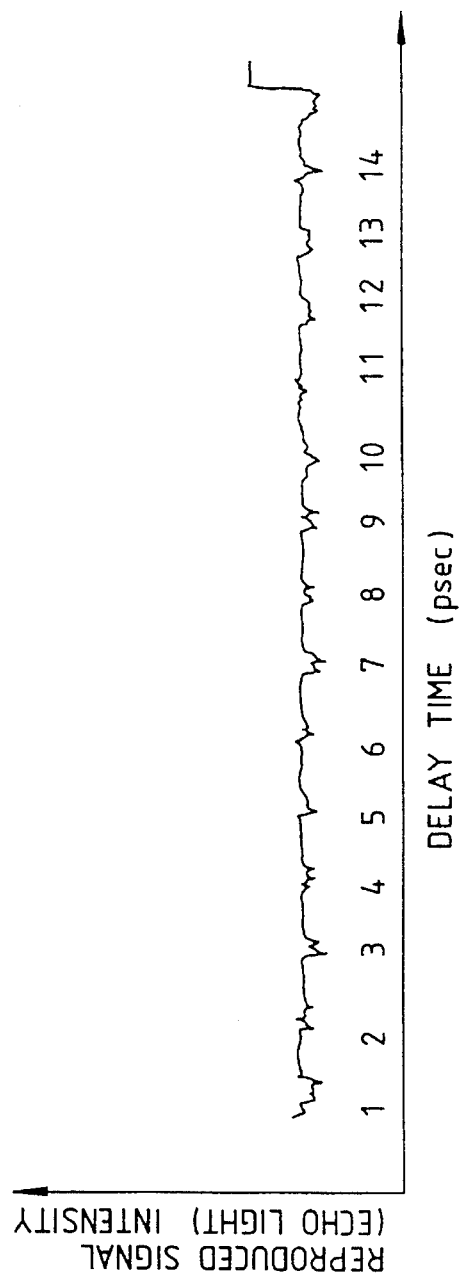
FIG. 7 is a wave form chart showing an example of the read output base line of the apparatus according to the third embodiment.

The result of the test is shown in FIG. 7. As is shown, a reading light does not write information with the output light of this degree, and not a single echo light proves to be detected. The average output sum of the reproducing excitation and the probe lights is to be 0.1 μW when reading data as described below.

(6) Let the average output sum of the recording excitation light (E0) and data light (E1) be 30 μW, and with the delay time of the data light (E1) fixed at five picoseconds (information to be recorded), the rotation of the disk 15 on the time modulator is stopped in order to provide a 30-second writing.

Figure 8:
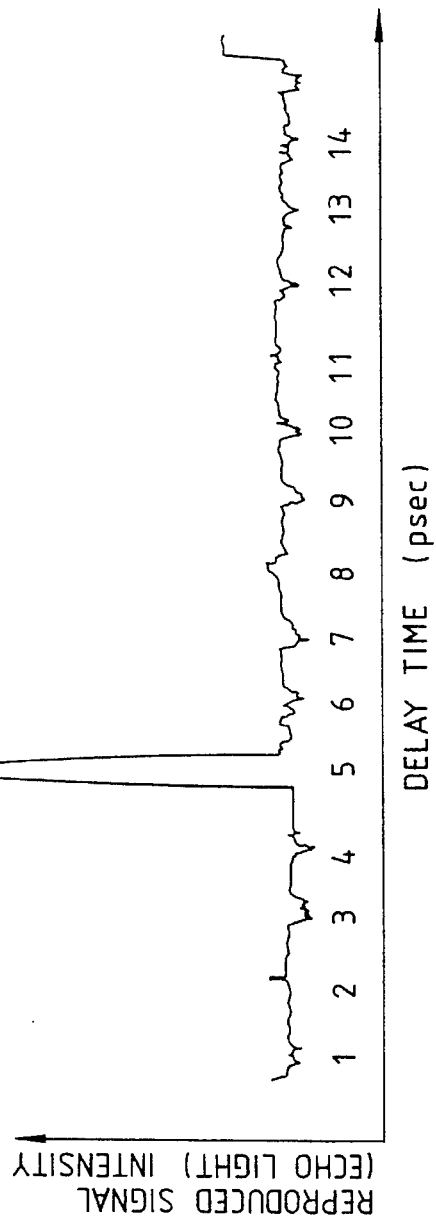
FIG. 8 is a wave form chart illustrating an example of the read output of the apparatus in accordance with the third embodiment.

(7) After this procedure, when reading is performed under the same conditions as above, the signal shown in FIG. 8 is obtained. As a result of the above, the light delay time, five picoseconds, is reproduced precisely.

(8) Finally, on the same location of the recording medium, continuous writing is performed under the following conditions: a plurality of delay times, a light output 30 μW, and a writing time of 30 seconds at each time spot.

Figure 9:
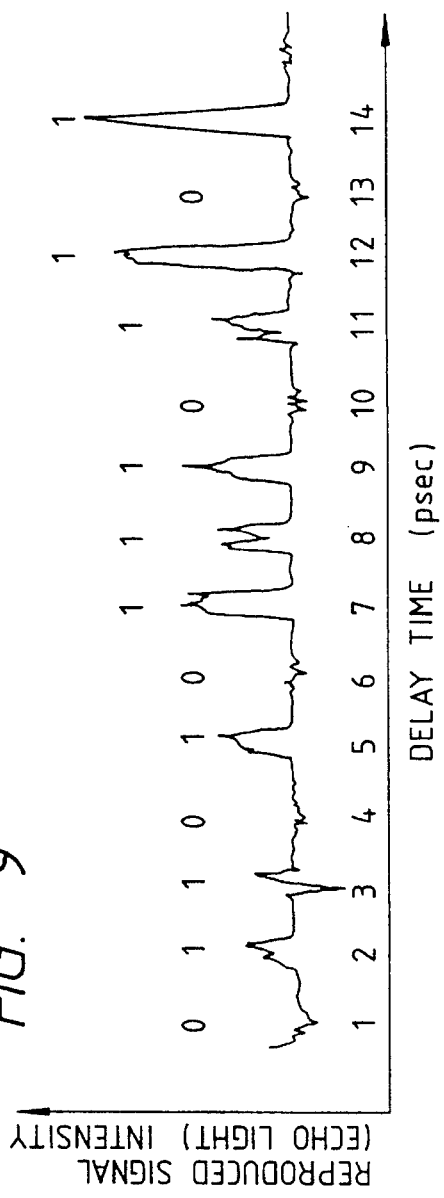
FIG. 9 is a wave form chart showing another example of the read output of the apparatus in accordance with the third embodiment.

After the above procedure, when reading is performed under the same conditions as listed in the above item (5), the result shown in FIG. 9 is obtained, which leads to show that multiple writing of 14 or more bits is possible at each fixed space spot.

Although an incoherent light having a relatively long correlation time is used as a light source in this embodiment, it has been possible to generate, with better reproducibility, a light having one figure shorter correlation time than the one used in the embodiment. Use of such a light permits a time memory capable of multiple writing of $10^2$ times or more bits than the one used in the embodiment.

Further, in the embodiments although a dye laser is utilized as the light source, the use of a semiconductor laser or a light emitting diode and the like would make the apparatus system small and simple.

Even in a case where the writing light is a coherent pulse, the heterodyne detecting method used in the embodiments is expected to have a higher S/N ratio than the conventional light density detecting method.

As described above, according to this invention, recording and reproducing with much higher density (i.e., larger capacity) and higher accuracy (i.e., higher S/N ratio) become possible.

This invention is further advantageous in the simplicity of the recording apparatus and the easy handling of the light source even though the recording density was almost the same as the conventional wavelength region PHB memory utilizing a variable wavelength laser.

The intensity of the heterodyne signal is considerably changed in accordance with a slight difference between the data light delay time (to be denoted by τ1 hereinafter) with respect to the record excitation light and the probe light delay time (to be denoted by τ2 hereinafter) with respect to the reproducing excitation light. This is an excellent advantage of the heterodyne method but a disadvantage of the same.

In the optical recording according to the present invention, τ1 and τ2 must coincide with each other in an accuracy of $10^{-16}$ sec in order to perform the reproduction while maintaining an excellent reproductionality. The above-described time corresponds to $10^{-2}$ μm converted into the optical path. Therefore, a reproducing apparatus for detecting the echo light by the heterodyne method must have a mechanical accuracy of about $10^{-2}$ μm, causing the overall cost of the apparatus according to the third embodiment to be excessively raised.

If the difference between τ1 and τ2 is modulated by one cycle or more, the heterodyne signal is also modulated in synchronization with it. Therefore, the echo light can be stably detected by modulating τ2 with respect to τ1 and by detecting a synchronous component of the heterodyne signal.

Now, the structure of a fourth embodiment will specifically be described with reference to FIG. 10.

A light source 1a arranged to serve as both a reproducing excitation light source and a probe light source, the light source comprising a mode synchronous YAG laser higher harmonic excitation kiton red laser capable of emitting a pulse light of a repetition frequency of 82 MHz. According to this embodiment, all of wavelength selection devices have been removed from the kiton red laser. As a result, an incoherent light can be obtained which has a central wavelength of 620 nm and a spectral width of 400 cm$^{31\ 1}$ (which corresponds to a correlation time of 37 femtoseconds).

A phase modulation means 17 is disposed between the triangular prism 13 and the retrieval modulation means 7a in the optical passage through which the data light travels, while an optical compensator 18 is disposed between the triangular prism 13 and the reflecting mirror 3 in the optical passage through which the exciting light travels. The phase modulation means 17 comprises, for example, an LiTaO$_3$ electro-optical device arranged in such a manner that the modulated phase width is 2π and the modulation frequency is 10 KHz. Another structure may be employed in which a reflecting mirror such as the prism 13 is slightly vibrated and the optical path is thereby vibrated so as to modulate the phase. Since an interference fringe of the probe light affected by a dispersion effect of the phase modulation means 17 and the excitation light which is not affected by the dispersion effect can be deformed, an optical compensator 18 is disposed between the triangular prism 13 and the reflecting mirror 3.

The output signal from the photodetector 9 is processed by a high speed lockin amplifier 10 so that only an AM modulation component of 5 MHz is taken out as an output. The low speed lockin amplifier 19 amplifies only the modulation component of 10 KHz in the output signal from the high speed lockin amplifier 10. Since noise is removed from the output from the low speed lockin amplifier 19, it has been clearly modulated in accordance with information stored in the medium.

The retrieval modulation means 7a are arranged in accordance with their thickness from a thin glass plate (4.52 picoseconds) so that the light traveling time is successively increased by 0.24 picoseconds. Although the phase modulation means 17 is controlled by the microcomputer 20a, the phase of the data light is not modulated.

The other structures according to the fourth embodiment are the same as those according to the third embodiment.

The structure according to the fourth embodiment was subjected to record and reproducing experiments under the following condition.

(1) A plate-like member having a thickness of 3 mm was manufactured by dispersing octaethylpolyfin into polymethylmethacrylate by $10^{-5}$ mol/l in a level of a molecular so as to serve as the recording medium 5.

(2) The recording medium 5 was placed in a liquid helium cryostat 14 maintaining the temperature at 10 K.

Then, the disc of the retrieval modulation means 7a was rotated and the light was allowed to pass through the glass plates having different thicknesses. As a result, the delay time of the data light was changed from 5.0 psec (picoseconds hereinafter), 5.24 psec and 5.48 psec with respect to the record excitation light, the data light and the record excitation light being then applied. At this time, it was arranged that the incoherent luminous intensity which is the sum of those of the data light and the record excitation light was 200 $\mu W/cm^2$ and a write time for each point was 6 seconds. As a result, three light pulses having the above-described delay times have been written.

(3) Also in this operation, the reproducing excitation light and the probe light were emitted from the same light source 1a similarly to the recording operation. At this time, the incoherent luminous intensity which is the sum of those of the reproducing excitation light and the probe light was diaphragmed to 2 $\mu W/cm^2$.

As for the probe light, the delay time was swept from a first predetermined value 4.52 psec to a second predetermined time 6.92 psec by rotating the disc of the retrieval modulation means 7a.

At this time, when the phase modulation means was operated, the output shown in FIG. 11B was obtained, while, when the phase modulation means 17 was not operated, the output shown FIG. 11A was obtained.

Figure 10:
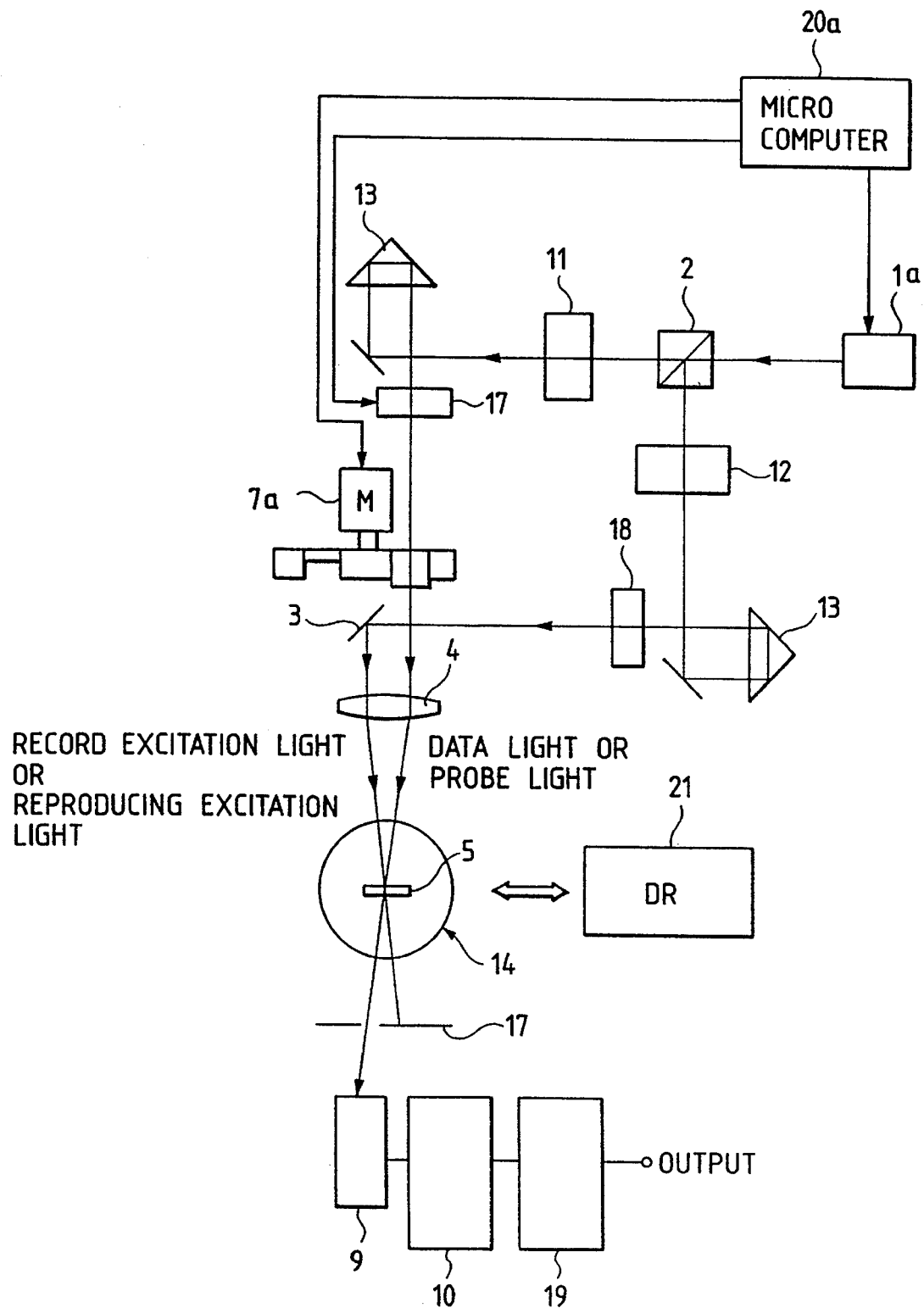
FIG. 10 is a view showing the structure of a fourth embodiment.

According to the structure shown in FIG. 10, the phase modulation means 17 is disposed in the passage through which the probe light travels, while the optical compensator 18 is disposed in the passage through which the excitation light travels. However, the optical compensator 18 may be disposed in the passage through which the probe light travels and the phase modulation means 17 may be disposed in the passage through which the excitation light travels.

The recording density of the optical memory utilizing the stimulated photon echo according to first, third and fourth embodiments can be expressed by (spatial recording density) × (time recording multiplicity)

The time recording multiplicity can be expressed as follows by using the phase relaxation time $T_2$ of the recording medium:

$$\text{Time recording multiplicity} = \frac{\text{Phase relaxation time } T_2}{\text{Time resolution of stimulated photon echo}}$$

In general, the relaxation time $T_2$ of a medium capable of recording data persistently is relatively short. Therefore, a high time resolution is necessary at a time of high density write/read.

However, the present technology encounters a limit of the direct modulation of the laser light to a level about 100 GHz. In this case, an obtainable time resolution is about 10 psec. Furthermore, the time resolution of a streak camera has a limitation of several picoseconds from a total judgement. In order to improve the multiplicity of the data light for a unit time, data light including a multiplicity of pulses having different delay times must be processed, causing an excessively long time to be taken. That is, in order to change the optical path or to insert the time modulator into the optical passage, the mirror, the prism, the glass plate, the plastic plate and the like must be moved, causing an excessively long time to be taken.

The inventors found a fact that, when data light is applied to a recording medium at the recording operation while applying DC Voltage or a electric field to the recording medium, echo light with the same time delay as that at the recording operation can be observed at the time of the reproduction operation only when the same voltage or the same electric field is applied to the recording medium.

A fifth embodiment of the present invention is arranged to perform recording or reproducing by applying DC voltage or an electric field to the medium. The principle of the fifth embodiment will be described with reference to a case in which DC voltage is applied.

According to the fifth embodiment, information about the data light can be expressed by delay time τ of the data light with respect to the record excitation light and supply voltage V at the time of writing the data light. That is, the position of the data light on the two dimensional coordinate corresponds to the information about the data light, the two dimensional coordinate being constituted by an axis which stands for the delay time τ and an axis which stands for the voltage V.

(1-1) Write process

The level of the voltage according to the above-described embodiment and to be applied to the recording medium while applying write excitation light and data light is changed from the first predetermined value to the second predetermined value. As an alternative to this, light may be applied only when the level of the voltage becomes a predetermined voltage.

(2-1) Read process

When the reproducing excitation light and voltage are applied to the recording medium and the level of the voltage is set to the predetermined level or the same is changed from the first predetermined level to the second predetermined level, the data light can be reproduced as an echo light when the voltage level coincides with the voltage level at the time of the recording operation.

(1-2) Another write process

A plurality of pulse lights are recorded as shown in FIG. 6 While applying a predetermined DC voltage level (or an electric field) to the recording medium.

(2-2) Another read process

In the above-described write process (1-2), data light is reproduced as an echo light only when the voltage level which is the same as that at the recording operation is applied to the recording medium. That is, if a reproducing excitation light is applied while applying a voltage which is different from the voltage at the time of the writing operation to the recording medium, data light is not reproduced.

The above-described write process (2-1) and the read process (2-2) are not affected each other and novel record can be performed if the level of the applied voltage is changed even if the delay times of the data light are the same.

The voltage may be applied to the recording medium in a vertical direction to the plane of the recording medium or in a parallel direction to the same.

Figure 12:
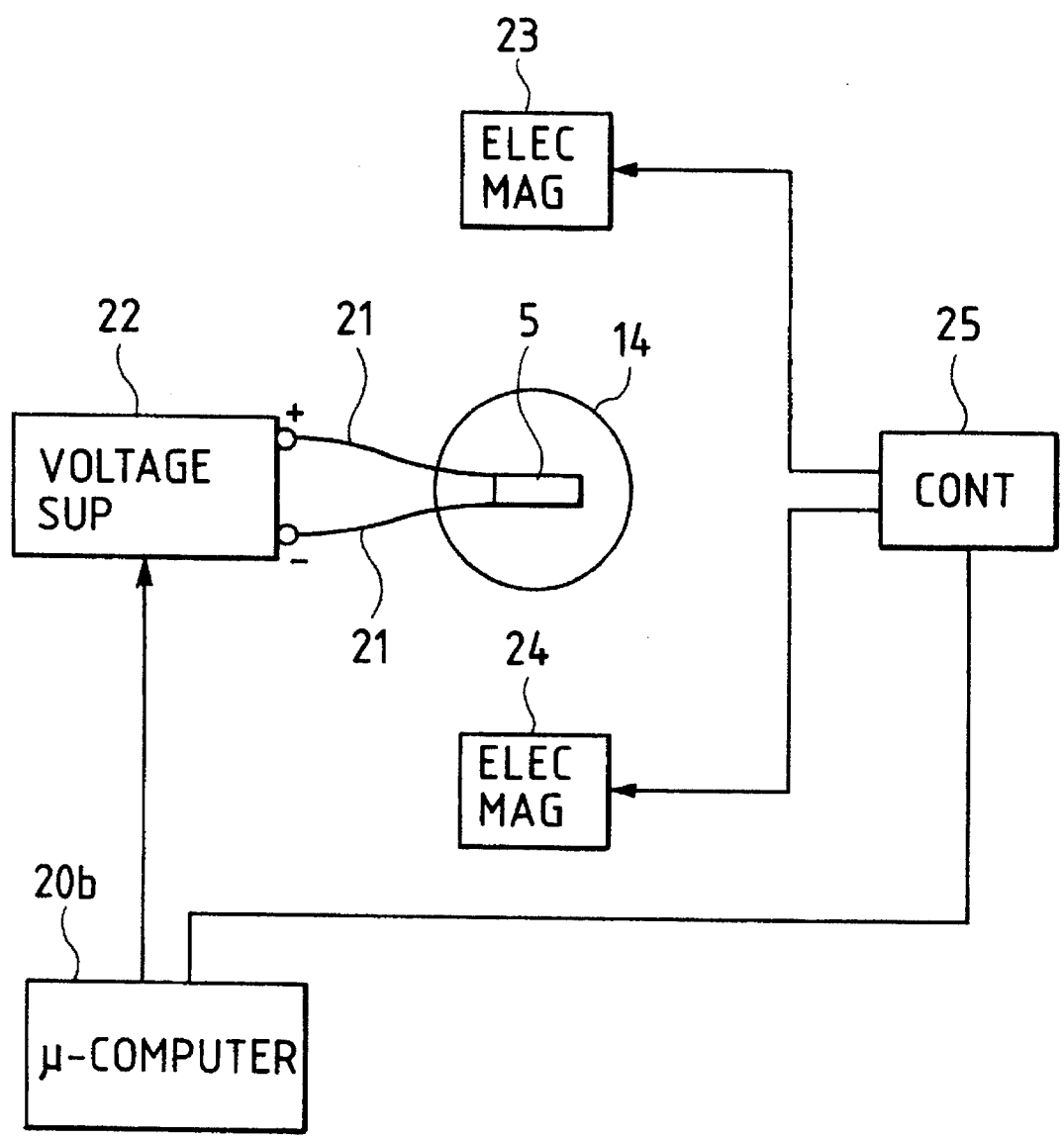
FIG. 12 is a view showing a portion of a fifth embodiment.

Now, the structure of the fifth embodiment will be described with reference to FIG. 12. The structure of an apparatus according to the second embodiment is arranged in such a manner that either a voltage applying means 22 for applying the voltage to the medium 5 or a magnetic field applying means constituted by electric magnets 23 and 24 and a control circuit 25 is provided in addition to the elements according to the first embodiment, the above-described means being controlled by a microcomputer 20b. The microcomputer 20b also controls the modulation means 7 and the light source 1 similarly to the computer 20a.

The fifth embodiment was subjected to experiments under the following conditions.

Figure 13:
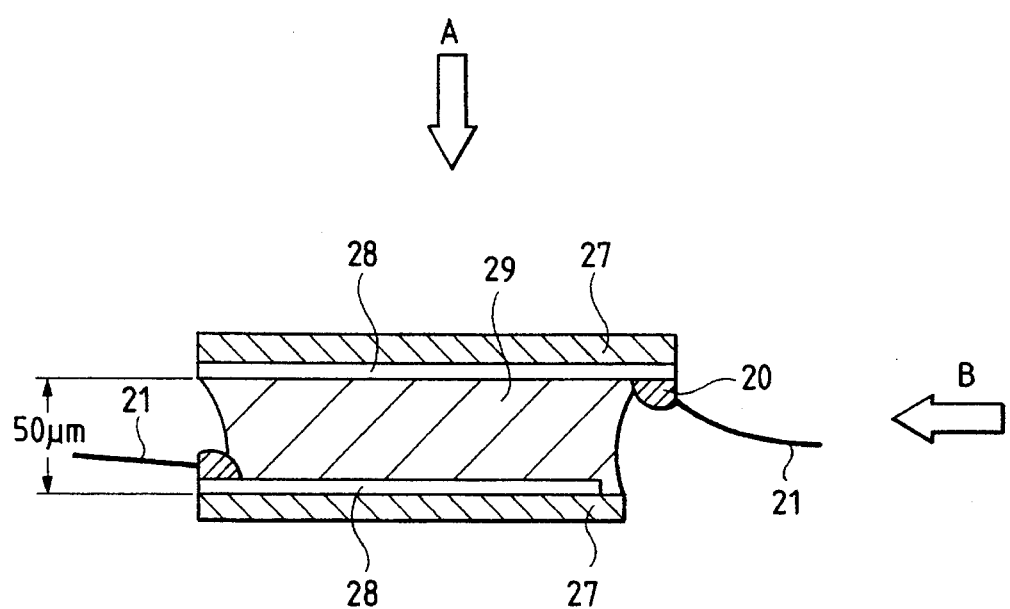
FIG. 13 is a view showing the structure employed at the time of experiments according to the fifth embodiment.
Figure 14:
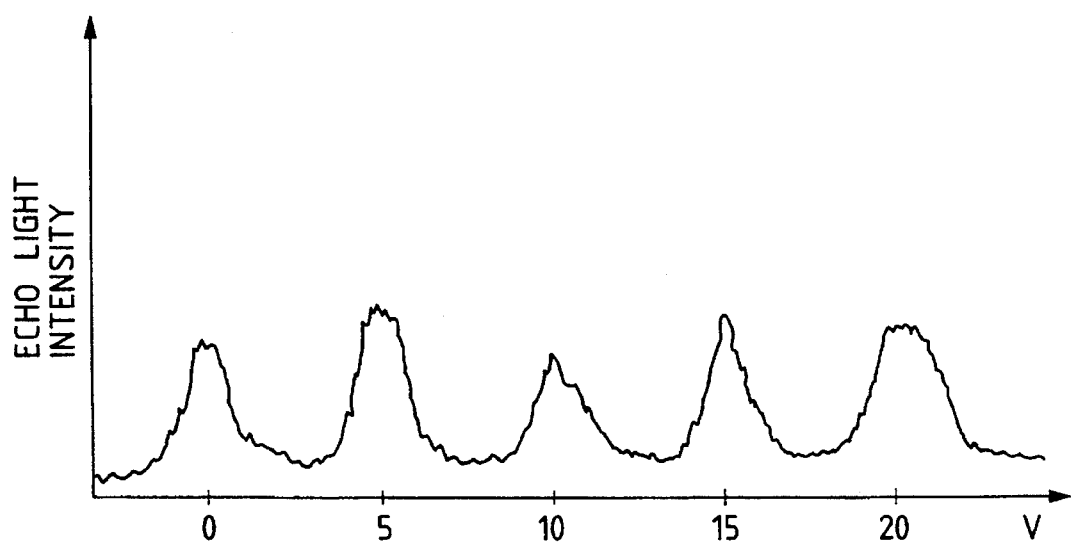
FIGS. 14 and 15 are views showing the results of experiments according to the fifth embodiment.

(1) The PHB recording medium was manufactured in such a manner that a material prepared by dissolving $10^{-4}$ mol/l of oxazine 4 (LAMDA PHYSIK, West Germany) into hydroxyethylmetharcrylate (abbreviated to "HEMA" hereinafter) was, as shown in FIG. 13, injected between two glass substrates 27 each of which has a transparent electrode layer 28 before polymerizing the HEMA. The polymerized layer serves as a recording layer 29.

(2) The electrode layer 28 formed on the recording medium 5 is connected to a DC power source 22 via a lead wire 21 so that DC voltage is applied to the recording layer 29.

By adjusting the power source 22, the voltage level to be applied to the recording medium 5 is intermittently changed as 0, 5, 10, 15 and 20 V.

A proper glass plate is selected by rotating the disc 7b of the time modulator 7 so as to make the delay time τ of the data light which passes through it to be 100 psec.

A record excitation light pulse (pulse width 100 psec) and data light pulse of the delay time τ=100 psec (pulse Width 100 psec) were applied to the same location on the recording medium 5 whenever the voltage level was changed. The light application was performed under the following conditions: the luminous intensity was 200 μW/cm² and the time of the application was 6 seconds (that is, when the application of the record excitation light pulse and the ensuing application of the data light pulse were counted as one time, applications of 6×82×10⁶ times was repeated).

Although the lights were applied in a direction designated by an arrow A of FIG. 13, they may be applied in a direction designated by an arrow B.

(3) By using 5, the luminous intensity was made 1/100 of that at the recording operation and the applied voltage was swept from the first predetermined level (0 V) to the second predetermined level (25 V) so that read was performed, resulting as shown in FIG. 6.

Then, the delay time τ was changed to 101 psec and recording was performed while changing the applied voltage to 0 V, 10 V and 20 V. Reading was performed by changing the probe light delay time τ to:

100 psec at the first time
101 psec at the second time
102 psec the third time.

Figure 15:
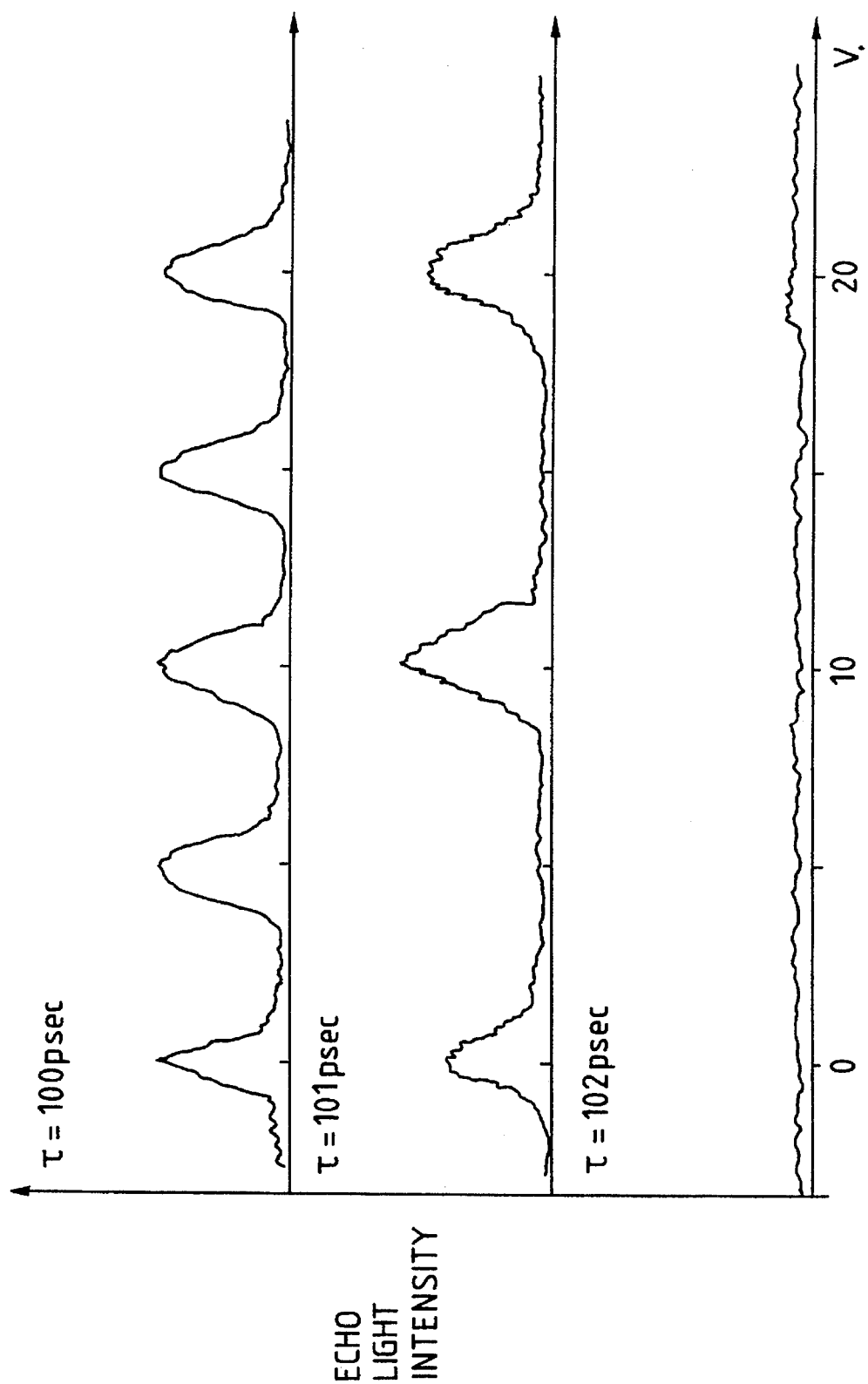

The results of the reading are shown in FIG. 15.

As a result of a further study, it was found that different information can be written by making different the direction of the electric field and the magnetic field given to the medium and the polarization plane of light to be applied.

Now, the principle of the sixth embodiment will be described.

In a case where, as shown in FIG. 4, a plurality of glass plates are successively arranged in accordance with the thickness starting from the most thin plate in order to successively elongate the delay time in a unit of 1 psec, 1000 glass plates having different thicknesses must be prepared in order to make 1000 different delay times if 1000 bit data is written.

Furthermore, since a disc (a supporting member) to which the glass plates are fastened must be moved considerably, a random access operation for selecting a desired glass plate takes an excessively long time in the case where there are provided a multiplicity of delay times.

If a sole transparent medium such as a glass plate is used, only a specific delay time corresponding to the thickness can be created. However, if a plurality of transparent media are layered, other delay times can be created although they are dispersive.

If the thickness is determined so as to hold the following relationship with respect to an optional j assuming that the thickness of the transparent medium is $d_j$ (j=1, 2, 3, ..., m), $2^m$ delay times can be created by inserting or drawing out each of the transparent media from the optical passage:

$$d_j > \sum_{k=1}^{j-1} d_k$$

That is, many delay times can be created by combining a small number of the transparent media. For example, 1024 different delay times can be created by using 10 glass plates.

Figure 16:
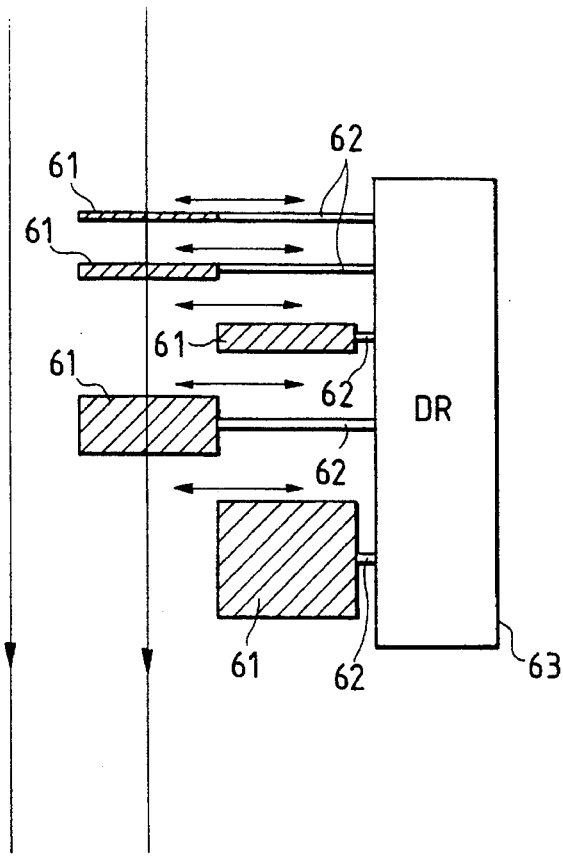
FIG. 16 is a view showing a portion of a sixth embodiment.

The sixth embodiment is the modification of the modulation means of the apparatus shown in FIGS. 1, 2 and 3. FIG. 16 illustrates the structure of this modification. The apparatus according to this embodiment comprises a plurality of glass plates 61 each of which is a transparent medium, the same number of arms 62 for supporting the glass plates 61 and a drive mechanism 63 for repeatedly inserting/drawing out the glass plates 61 from the optical passage through which the data light or the probe light travels by moving the arm 62.

As the glass plates 61, quartz glass the refraction factor of which was 1.475 was employed and the thickness $d_i$ was arranged to be 0.51 mm, 1.01 mm, 2.02 mm, 4.04 mm and 8.08 mm so that the light delay time was made to be 0.8 psec, 1.6 psec, 3.2 psec, 6.4 psec and 12.8 psec.

The above-described glass plates 61 are supported by arms which are capable of moving them perpendicular to the optical passage through which the data light and the probe light travel, the glass plates 61 being arranged in the direction of the optical passage. Therefore, the delay time can be successively changed from zero second to 25 psec at intervals of 0.8 psec by inserting a combination of the plurality of glass plates 61 into the optical passage.

In order to prevent the change in the thickness of the quartz glass during recording and reproducing, the overall body of the delay device is placed in a constant-temperature bath at the time of use.

The device according to this embodiment was subjected to the following experiments while employed in the apparatus shown in FIG. 3.

(1) The light source 1 comprises a CW mode synchronous $Ar^+$ laser excitation kiton red laser which is capable of emitting a pulse light of a repetition frequency of about 80 MHz. In this case, the output light was made to be an incoherent light having a central wavelength of 630 nm and the spectral width of about 30 $cm^{-1}$ by using a birefrigence filter (omitted from illustration) in order to absorb the zero-photon absorption band of the OEP. The repetition frequency of the light pulse is about 80 MHz and the correlation time of the same is about 500 femtoseconds.

(2) As a PHB recording medium 5, a disk was used the recording layer of which was made of a film of about 1 mm in thickness and prepared by dissolving $3 \times 10^{-4}$ wt % octaethylpolfin (OEP) into polymethylmethacrylate (PMMA).

(3) As the optical recording/reproducing apparatus, the apparatus according to the third embodiment was used.

(4) By properly inserting/drawing out the plurality of glass plates 61 of the apparatus shown in FIG. 16, the light delay time of the light which passes there is changed by 0.8 or 1.6 psec.

(5) Writing was successively performed to the same location on the medium 5 to which no information has been written at a light output of 30 µW and writing interval at each of the time points was 10 seconds while changing the delay time by an interval of 1.6 psec.

Figure 17:
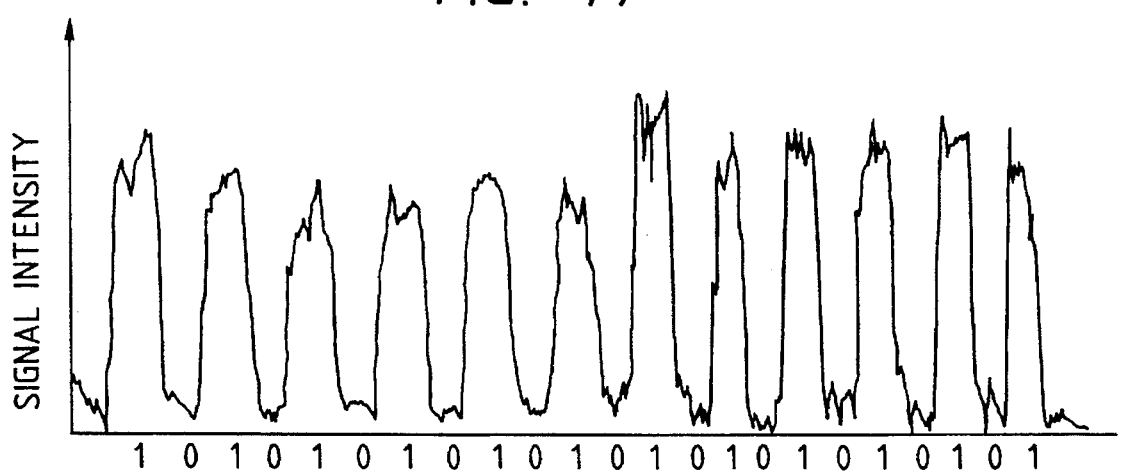
FIG. 17 is a view showing the results of experiments according it the sixth embodiment.

Then, read was performed at an interval of the light delay time of 0.8 psec while diaphragming the sum of the output of the reproducing excitation light and the probe light to 0.1 µW, resulting as shown in FIG. 17.

The time taken at this time was about two minutes in the recording and about four minutes in the reproducing. Therefore, the time necessary to change the light delay time can be significantly sortened neligible with respect to the overall necessary operation time.

What is claimed is:

1. A time-domain stimulated photon echo recording method of recording information on a recording medium capable of persistent Spectral Hole Burning, said method comprising the steps of:

emitting incoherent light by a light source;

splitting said incoherent light from said light source into two light elements;

irradiating the same location of said recording medium with said two light elements; and delaying, based upon information to be recorded, the incident time of one of said two light elements on said recording medium with respect to that of the other by changing an optical path length of one of said two light elements to said medium, and thereby persistently recording on said location information corresponding to an amount of said delaying.

2. A method according to claim 1 wherein said delaying step includes the step of regulating the delay time based upon information to be recorded.

3. A method according to claim 1 wherein said delaying step makes the optical path of one of said two elements to said medium longer than that of the other.

4. A method according to claim 1, wherein said irradiating step is effected while said location is subjected to a static field or magnetic field.

5. A method according to claim 1, wherein at last one light permeable member is inserted into an optical path of one of said two light elements to change said optical path length.

6. A time-domain stimulated photon echo recording apparatus for recording information on a recording medium capable of persistent Spectral Hole Burning, said apparatus comprising:

a light source for generating incoherent light; means for dividing said incoherent light generated by said light source into two light elements;

an optical system for radiating said two light elements to the same location on said medium; and at least one light permeable member through which one of said two light elements passes in order to delay the incident time of one of said light elements on said location relative to that of the other in accordance with information to be recorded, and thereby to persistently record on said location information corresponding to an amount of said delay.

7. A time-domain stimulated photon echo recording apparatus for recording information on a recording medium capable of persistent Spectral Hole Burning, said apparatus comprising:

(a) a light source emitting incoherent light;

(b) a means for splitting said incoherent light from said light source into two light elements;

(c) a means for radiating said two light elements on the same location on said recording medium; and (d) a means for delaying, based upon information to be recorded, one of said two light elements with respect to the other, by changing an optical path length of one of said two light elements to said medium and thereby persistently recording on said location information corresponding to an amount of said delaying.

8. An apparatus according to claim 7, further comprising means for applying a static electric field or magnetic field to said location.

9. An apparatus according to claim 8, wherein said applying means can change a value of said static electric field or magnetic field in order to record different information on the same location.

10. An apparatus according to claim 7, wherein said delaying means comprises a means for changing said optical path length by inserting at least one light permeable member into an optical path of one of said two light elements.

11. An apparatus according to either claim 10 or claim 6, comprising means for combining two or more light permeable members to generate at least two delay times.

12. A time-domain stimulated photon echo recording method for recording information on a recording medium capable of persistent Spectral Hole Burning, said method comprising the steps of:

irradiating the same location of said medium with two incoherent luminous fluxes emitted from a single light source; and delaying, based upon information to be recorded, the incident time of one of said two incoherent luminous fluxes on said recording medium with respect to the other, and thereby persistently recording on said location information corresponding to an amount of said delaying.

13. A time-domain stimulated photon echo recording method of recording information on a recording medium capable of persistent Spectral Hole Burning, said method comprising the steps of:

radiating a record excitation light and a data light pulse divided from one light emitted from one incoherent light source on the same location of said recording medium, while said location is subjected to a static electric field or magnetic field; and delaying, based upon information to be recorded, an incident time of one of said record excitation light and data light pulse into said location relative to an incident time of the other, and thereby persistently recording on said location information corresponding to an amount of said delaying.

14. A method according to claim 13, wherein the radiating step is repeated while said location is subjected to a static electric field or magnetic field having a level different from that of the previously recited static electric field or magnetic field.

15. A time-domain stimulated photon echo recording apparatus for recording information on a recording medium capable of persistent Spectral Hole Burning, said apparatus comprising:

(a) means for radiating incoherent record excitation light to said medium, (b) means for radiating incoherent data light to said medium;

(c) an optical system for directing said record excitation light and said data light to the same location on said medium;

(d) means for applying a static electric field or magnetic field to said location; and (e) means for delaying, based upon information to be recorded, an incident time of one of said record excitation light and said data light on said location relative to an incident time of the other, and thereby persistently recording on said location information corresponding to an amount of said delaying.

16. An apparatus according to claim 15, wherein said applying means changes the level of said static electric field or magnetic field when a different data light is radiated to the same location in order to record different information.

17. A time-domain stimulated photon echo recording apparatus for recording information on a recording medium capable of persistent Spectral Hole Burning, said apparatus comprising:

means for irradiating the same location on said medium with two incoherent luminous fluxes emitted from a single light source; and means for delaying, based upon information to be recorded, the incident time of one of said two incoherent luminous fluxes on said medium with respect to the other, and thereby persistently regarding on said location information corresponding to an amount of said delaying.

18. A time-domain stimulated photon echo recording method of recording information on a recording medium capable of persistent Spectral Hole Burning which has previously stored first information to be recorded by irradiating the same location of said recording medium with two incoherent light elements split from one incoherent light source, while said location is subjected to a first static electric field or magnetic field and delaying, based upon said first information to be recorded, the incident time of one of said two light elements on said location with respect to that of the other by changing an optical path length of one of said two light elements, said method comprising the steps of:

irradiating said location with two incoherent light elements split from an incoherent light source, while said location is subjected to a second static electric field or magnetic field different from the first one, and delaying, based upon second information to be recorded, the incident time of one of the last-mentioned two light elements on said location with respect to that of the other by changing an optical path length of one of the last-mentioned two light elements, and thereby persistently recording on said location information corresponding to an amount of said delaying.

19. A time-domain stimulated photon echo recording method of recording information on a recording medium capable of persistent Spectral Hole Burning, said method comprising steps dividing an incoherent light generated from one light source into two light elements, and radiating said two light elements to the same location on said medium, and passing either of said two light elements through at least one light permeable member in order to delay the incident time of one of said two light elements onto said location relative to that of the other in accordance with information to be recorded, and thereby persistently recording on said location information corresponding to an amount of said delay.

* * * * *